(12) United States Patent
Kim

(10) Patent No.: US 6,729,539 B2
(45) Date of Patent: May 4, 2004

(54) CHECK/CARD FOR INTERNET BASED COMMERCE AND A METHOD FOR DEALING THE CHECK/CARD

(76) Inventor: Hong-Il Kim, 118 dong 604 ho Hanjin Town Apt., 346 Haengdang-dong, Seongdong-gu, Seoul 133-070 (KR)

( * ) Notice: Subject to any disclaimer, the term of this patent is extended or adjusted under 35 U.S.C. 154(b) by 0 days.

(21) Appl. No.: 10/309,744

(22) Filed: Dec. 4, 2002

(65) Prior Publication Data

US 2003/0132280 A1 Jul. 17, 2003

Related U.S. Application Data

(63) Continuation of application No. PCT/KR01/00965, filed on Jun. 7, 2001.

(30) Foreign Application Priority Data

Jun. 8, 2000 (KR) ................................ 10-2000-0031300
Jun. 20, 2000 (KR) .................................. 10-2000-33858

(51) Int. Cl.$^7$ ............................................... G06F 17/60
(52) U.S. Cl. ..................................... 235/379; 235/380

(58) Field of Search ................................ 235/379, 380, 235/382; 705/17, 18

(56) References Cited

U.S. PATENT DOCUMENTS

| | | | | |
|---|---|---|---|---|
| 5,936,219 A | * | 8/1999 | Yoshida et al. | ............. 235/379 |
| 5,963,647 A | * | 10/1999 | Downing et al. | ............. 705/39 |
| 6,000,832 A | * | 12/1999 | Franklin et al. | ............. 700/232 |
| 6,076,069 A | * | 6/2000 | Laor | ............. 705/14 |

\* cited by examiner

*Primary Examiner*—Thien M. Le
*Assistant Examiner*—Lisa M Caputo
(74) *Attorney, Agent, or Firm*—Dilworth & Barrese, LLP

(57) ABSTRACT

An embodiment of an Internet check according to the present invention is disclosed, it includes a check symbol for indicating a kind of a check, a bank symbol for indicating a bank issuing the check, an issued date symbol for indicating the issued date, an issued number symbol for indicating an issued number of the check, an issue-price symbol for indicating the price of the issued check, a password symbol for indicating a password of the issued check. And each of these symbols consists of characters or numbers or figures or symbols or a combination thereof.

27 Claims, 3 Drawing Sheets

FIG.3a

IC@kr ICBac20000102-0a0b0c$5,000$20000103:2340★g2f5ed4▦a10 SjYUe3mVjd

FIG.3b

IC(b)kr ICBcd20000102-0a0b0c$5,000$20000103:2340★krHab1cd2f▣f5d4▦j10 jY

FIG.3c

IC©kr ICBef20000102-0a0b0c▓▓▓▓/5,000₩20001103★▓▓▓▓▓▦a10 jYn◇k iUe4m

FIG.3d

IC(P)kr ICBxw20000102-00a00b00c₩10,000₩20001205★a10 SjYdUe3mVjd⇔krA

CHECK/CARD FOR INTERNET BASED COMMERCE AND A METHOD FOR DEALING THE CHECK/CARD

PRIORITY

This application is a continuation of International Application PCT/KR01/00965, filed Jun. 7, 2001, published under PCT Article 21(2) in English, and entitled "A CHECK/CARD FOR INTERNET BASED COMMERCE AND A METHOD FOR DEALING THE CHECK/CARD", which claims priority to an Application filed in the Korean Intellectual Property Office on Jun. 8, 2000 and assigned Serial No.: 2000/31300, and to an Application filed in the Korean Industrial Property Office on Jun. 20, 2000 and assigned Serial No. 2000/33858, the contents of which are herein incorporated by reference.

BACKGROUND OF THE INVENTION

1. Field of the Invention

This invention relates to an electronic check and an electronic card used in the Internet-based electronic commerce. And in this invention, an Internet based electronic commerce method using the electronic checks and electronic cards among customers, providers and a bank is disclosed too.

2. Description of the Related Arts

So far the, technologies on an electronic check and an electronic card for the Internet-based electronic commerce have not been provided. Furthermore, a transacting method of the electronic check and an electronic card between customers, providers and banks has not been provided. Especially, as the transacting method of the electronic check and an electronic card between customers, providers and banks of each country has not been provided, an international transaction has not been made easily although the Internet-based international transaction has been activated.

And until now, it was very difficult to confirm whether in the electronic commerce users use their real names or not, and then it was not easy to impose a correct tax and to confirm user's identities.

Also, as there is no any international standardization, the international electronic commerce is inconvenient.

SUMMARY OF THE INVENTION

A preferable embodiment of an Internet check according to the present invention comprises a check symbol for indicating a kind of a check, a bank symbol for indicating a bank issuing the check, an issued date symbol for indicating the issued date, an issued number symbol for indicating an issued number of the check, an issue-price symbol for indicating the price of the issued check, a password symbol for indicating a password of the issued check. And each of these symbols consists of characters or numbers or figures or symbols or a combination of these, and these symbols do not have any real shape and are used in electronic commerce based on the Internet.

Another preferable embodiment of an Internet check according to the present invention comprises a check symbol for indicating a kind of a check, a bank symbol for indicating a bank issuing the check, an issued date symbol for indicating the issued date, an issued number symbol for indicating an issued number of the check, a first empty space for entering an issue-price, a issue-price limit symbol for indicating the limit of the issue-price of the check, a second empty space for entering a recipient's identification and a password symbol for indicating a password of the issued check.

A preferable embodiment of an Internet card according to the present invention comprises a card symbol for indicating a kind of a card, an issue organization symbol for indicating an issue organization of the card, an issued date symbol for indicating the issued date, an issued number symbol for indicating an issued number of the card, an issue-price symbol for indicating the price of the issued card, a password symbol for indicating a password of the issued card.

A preferable embodiment of an electronic commerce method according to the present invention comprises a step for requesting a bank to issue the electronic check or an electronic card by a customer after the customer pays money to the bank and his real name is confirmed by the bank, a step for issuing the customer the electronic check or the electronic card according to the request by the bank, a step for paying in the electronic check or in the electronic card by the customer in order to pay in exchange for wares, that the customer purchased or used and providers provided, a step for asking the bank to pay in cash for the paid electronic check or the electronic card by the provider, a step for informing the provider examined results for payment after confirming whether the data of the electronic check or the electronic card coincides with the data stored in a check/card issuing database by the bank, a step for issuing the customer a receipt by the provider, a step for transferring into the provider's deposit account in accordance with the examined result by the bank.

Another preferable embodiment of an electronic commerce method using an Internet based electronic check and an Internet based electronic card according to the present invention comprises a step for requesting a first bank to issue an electronic check or an electronic card by a customer after the customer pays money to a first bank and his real name is confirmed by a first bank, a step for issuing the customer an electronic check or in the electronic card by a first bank, a step for paying in the electronic check or in the electronic card by the customer in order to pay in exchange wares, that the customer purchased or used and providers provided, a step for asking a second bank to pay in cash for the paid electronic check or the electronic card by the provider, a step for requesting a first bank to exchange the electronic check or the electronic card by the second bank, a step for informing a second bank examined results for payment after confirming whether the data of the electronic check or the electronic card coincides with the data stored in a check/card issuing database by a first bank, a step for informing the provider the examined result by a second bank, a step for issuing the customer a receipt by the provider, a step for transferring money into a second bank for the electronic check or the electronic card by a first bank, a step for transferring money into the provider's deposit account in accordance with the examined result by a second bank.

BRIEF DESCRIPTION OF THE DRAWINGS

The object, other features and advantages of the present invention will become apparent from the detailed description to follow taken in conjunction with the appended claims and the drawings, in which:

FIG. 3a illustrates a preferable embodiment of an Internet check according to the present invention;

FIG. 3k illustrates a preferable embodiment of a recipient appointed Internet check according to the present invention;

FIG. 3c illustrates a preferable embodiment of a recipient non-appointed Internet check according to the present invention; and FIG. 3d illustrates a preferable embodiment of an Internet card according to the present invention.

DESCRIPTION OF THE PREFFERED EMBODIMENTS

1. An Internet Check

A First Preferable Embodiment

Figure 1:
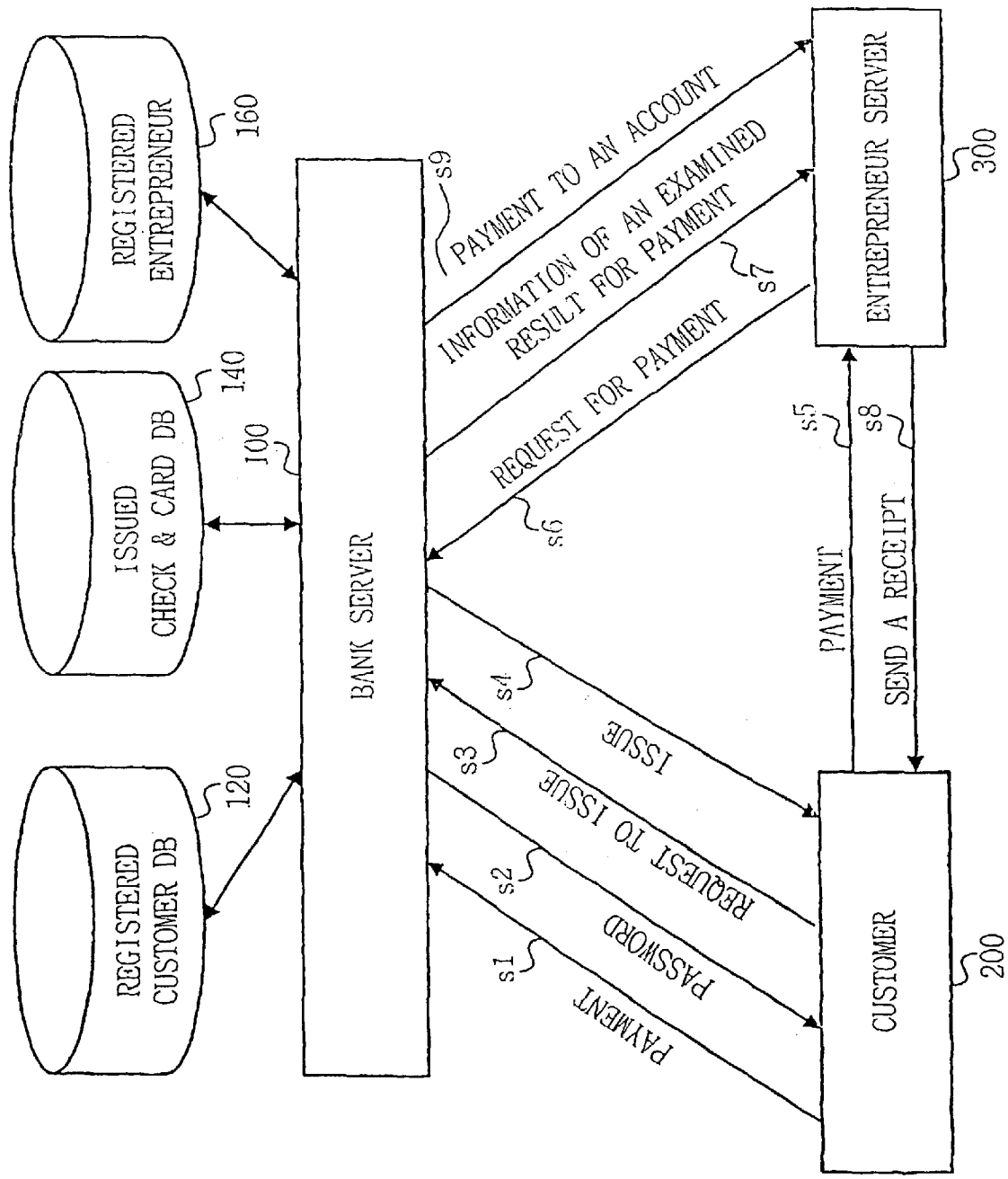
FIG. 1 illustrates a flow chart of a transaction method of an Internet check/card according to a preferable embodiment of the present invention.

An Internet check according to the present invention comprises a check symbol for indicating a kind of a check, a bank symbol for indicating a bank having issued the check, an issued date symbol for indicating the issued date, an issued number symbol for indicating an issued number of the check, an issue-price symbol for indicating the price of the issued check, a password symbol for indicating a password of the issued check. And those symbols consist of characters or numbers or figures or symbols or a combination of these, and those symbols do not have any real shape and are used in electronic commercial transaction based on the Internet.

It is more preferable further to comprise a validity symbol for indicating a term of validity of the check.

It is more preferable further to comprise a recipient's identification symbol for indicating the assigned recipient of the check.

It is more preferable to add a validity symbol for indicating the term of validity of the check and a recipient's identification symbol for indicating the assigned recipient of the check.

And it is more preferable that the bank symbol is a combination of a nation code, an inherent bank code and a branch office's code.

And it is more preferable that a recipient's identification symbol is identical to a registered entrepreneur identification of a recipient.

And it is more preferable that registered entrepreneur identification is a combination of a nationality code of an entrepreneur, a business category code of an entrepreneur and a registered entrepreneur code.

A preferable embodiment of an Internet check according to the present invention is illustrated in FIG. 3a.

IC(a) krICBac20000102-0a0b0c$5,000$20000103:2340★g2f5cd4▓a1l0 SjYUe3mVjd where, the "IC(a)" indicates a check symbol the "krICBac" indicates a bank (kr: nation code, ICB: inherent bank code, ac: branch office code) having issued a check the "20000102" indicates an issued date the "0a0b0c" indicates an issued number the "$5,000$" indicates an issued amount of money the "20000103:2340" indicates an effective date, hour and minute the "★g2f5ed4▓a1l0 SjYUe3mVjd" indicates a password.

Another preferable embodiment of a recipient-appointed Internet check according to the present invention is illustrated in FIG. 3b.

IC(b) krICBcd20000102-0a0b0c$5,000$20000103:2340★krHab1cd2f■f5d4▓jl0 jY where, the "IC(b)" indicates a check symbol the "krICBcd" indicates a bank having issued a check the "20000102" indicates an issued date the "0a0b0c" indicates an issued number the "$5,000$" indicates an issued amount of money the "20000103:2340" indicates an effective date, hour and minute the "krHab1cd2f" indicates a recipient's identification (a combination of kr (nationality code of an entrepreneur), H (business category code of an entrepreneur), ab1cd2f (a registered entrepreneur code of an entrepreneur)

the "■f5d4▓jl0 jY" indicates a password.

A Second Preferable Embodiment

Another embodiment of an Internet check according to the present invention comprises a check symbol for indicating a kind of a check, a bank symbol for indicating a bank having issued the check, an issued date symbol for indicating the issued date, an issued number symbol for indicating an issued number of the check, a first empty space for entering an issue-price, an issue-price limit symbol for indicating the limit issue-price of the issuing check, a second empty space for entering a recipient's identification and a password symbol for indicating a password of the issued check.

And those symbols consist of character or numbers or figures or symbols or a combination of them, and those symbols do not have any real shape and are used in electronic commercial transaction based on the Internet.

It is more preferable further to comprise a validity symbol for indicating the term of validity of a check.

It is more preferable to insert a nationality code of an entrepreneur or a business category code of an entrepreneur in a second empty space for entering a recipient's identification, and then to limit the usable area of a check within the corresponding country or within the corresponding business.

And it is more preferable that the bank symbol is a combination of a nation code, an inherent bank code and a branch office's code.

And it is more preferable that the recipient's identification symbol is identical to the registered entrepreneur ID of a recipient.

And it is more preferable that the registered entrepreneur identification is a combination of a nationality code of entrepreneur, a business category code of an entrepreneur and an inherent code of an entrepreneur.

A second preferable embodiment of a recipient-non-appointed Internet check according to the present invention is illustrated in FIG. 3c.

IC(c) krICBef20000102-0a0b0c*,*₩/5,000 20001103★krH****▓al0 jYn♧kiUe4m ₩ where, the "IC(c)" indicates a check symbol the "krICBef" indicates a bank having issued a check the "20000102" indicates an issued date the "0a0b0c" indicates an issued number the "*,*₩" indicates a first empty space, for entering the amount of money to be issued the "/5,000₩" indicates the limit of the issue-price of an issued check the "20000103" indicates an effective date the "krH****" indicates a second empty space for entering an recipient's identification (kr limits a usable area and H limits a business category)

the "▓al0 jYn♧kiUe4m" indicates a password.

2. An Internet Card

An Internet card according to the present invention comprises a card symbol for indicating a kind of a card, an issuing organization symbol for indicating an issue organization of a card, an issued date symbol for indicating an issued date, an issued number symbol for indicating an issued number of a card, an issue-price symbol for indicating the issue price of a card, a password symbol for indicating a password of the issued card.

And those symbols consist of characters or numbers or figures or symbols or a combination of them, and those symbols do not have any real shape and are used in electronic commercial transaction based on the Internet.

It is more preferable further to comprise a validity symbol for indicating a term of validity of a card.

It is more preferable further to comprise a usable area limit symbol to limit the usable area of a card and a business category limit symbol to limit the usable business category of a card.

And the issue organization symbol is a combination of a nation code and an inherent code of an issue organization, and the issue organization comprises banks, security companies, department stores, airline companies, oil companies and service providers of Internet portal sites.

A preferable embodiment of an Internet card according to the present invention is illustrated in FIG. 3d.

IC(p) krICBxw20000102-00a00b00c₩10,000₩20001205★a1l0 SjYdUe3mVjd♻krA where,

- the "IC(p)" indicates a card symbol for the card
- the "krICBxw" indicates an issue organization
- the "20000102" indicates an issued date
- the "00a00b00c" indicates an issued number
- the "₩10,000₩" indicates the amount of money to be issued
- the "20001205" indicates an effective date
- the "★a1l0 SjYdUe3mVjd" indicates a password.
- the "kr" indicates the usable area of a card
- the "A" indicates the usable business category of a card

3. An Electronic Commerce Method Using the Internet Based an Electronic Check and an Electronic Card

A First Embodiment

An electronic commercial transaction flow among customers, entrepreneurs and a bank is illustrated in FIG. 1.

The present invention relates to an Internet based electronic commerce method among customers, entrepreneurs and a bank that use an electronic check and an electronic card. The method comprises a step for requesting a bank to issue an electronic check or an electronic card by a customer after the customer pays money to the bank and the customer's real name is confirmed by the bank, a step for issuing the customer an electronic check or the electronic card by the bank, a step for using the electronic check or the electronic card by the customer in order to pay the money in purchasing or using the wares of the entrepreneur, a step for asking the bank to pay in cash for the paid electronic check or the electronic card by the entrepreneur, a step for informing the entrepreneur an examined result for payment after confirming whether the data of the electronic check or the electronic card coincides with the data stored in an issued check/card database by the bank, a step for issuing the customer a receipt by the entrepreneur (in case of using a card, issuing a confirmation document for the remaining money together with a receipt) a step for paying the money to the entrepreneur's deposit account in accordance with the examined result by the bank.

It is preferable further to comprise a step for sending the customer a receipt for the paid money and a password through the customer's registered e-mail address by the bank if the payment for the issued electronic check or the issued electronic card on the Internet is not executed in real time or if the confirmation of the customer's real name by the bank is not exact after the customer paid the money and a step for requesting the bank to issue an electronic check or an electronic card after finishing the real name confirmation procedure by using the password received from the bank.

In order to get the customer identification it is preferable that a customer registers his present information including a name, a resident or a business registration number, an e-mail address, an account number for paying the money, a password for confirming himself into a database for registering customers of a bank.

It is preferable that the customer identification is a combination of a nationality code, a code for indicating category of a customer and an inherent code of the customer.

It is preferable that the issued amount of the money of the electronic check or the electronic card by the customer is paid to the bank by using any one of deposit, remittance, a postal transferring account, a giro, a CMS transferring account, a credit card, an advanced paying card and a direct paying card.

It is preferable that in order to get an entrepreneur's identification, he registers a name, a resident registration number, a business registration number, a category of business, an account number for paying money, personal information including a password for confirming himself into a database for registering entrepreneurs of the bank.

It is preferable in the step for issuing the electronic check or the electronic card that the bank issues it after confirming whether the information on the customer requesting it coincides with the data stored in the customer registration database.

It is preferable in the step for examining the cash payment for the electronic check or the electronic card that the bank examines it after confirming whether the information on the entrepreneur requesting it coincides with the data stored in the entrepreneur registration database.

A Second Embodiment

Figure 2:
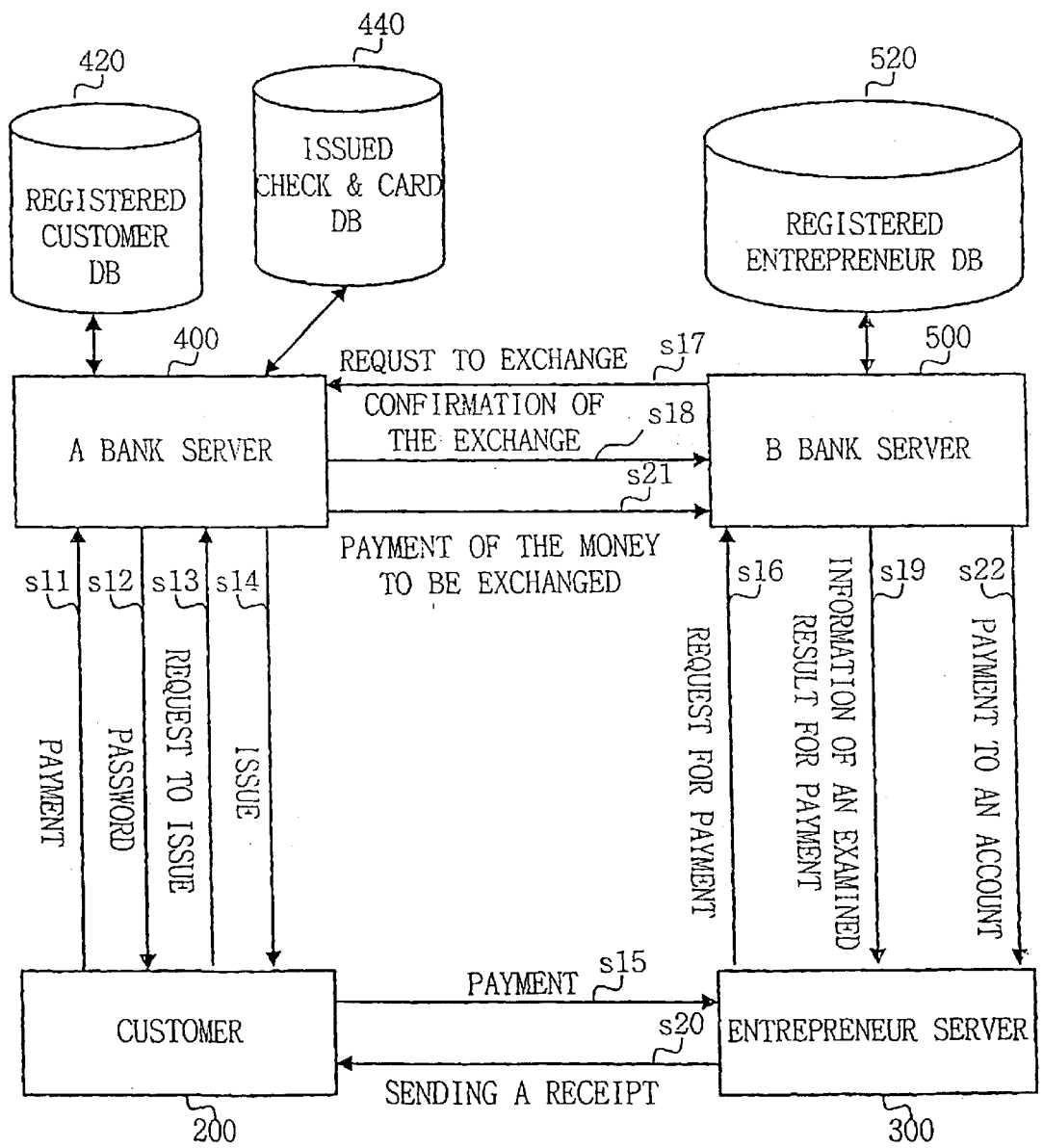
FIG. 2 illustrates a flow chart of a transaction method of an Internet check/card according to another preferable embodiment of the present invention.

An electronic commercial transacting flow among customers, entrepreneurs and banks is illustrated in FIG. 2.

Another embodiment in accordance with the present invention relating to the Internet based electronic commerce method among customers, entrepreneurs and banks that are using an electronic check and an electronic card is disclosed. The invention comprises a step for requesting a first bank to issue an electronic check or an electronic card by a customer after the customer pays money to a first bank and his real name is confirmed by a first bank, a step for issuing the customer an electronic check or an electronic card by a first bank, a step for using the electronic check or the electronic card by the customer in order to pay the money for purchasing or using of wares of the entrepreneur, a step for asking a second bank to pay in cash for the paid electronic check or the electronic card by the entrepreneur, a step for requesting a first bank to exchange the electronic check or the electronic card by a second bank, a step for informing a second bank the examined result for payment after confirming whether the data of the electronic check or the electronic card coincides with the data stored in a check/card issuing database by a first bank, a step for informing the entrepreneur the examined result by a second bank, a step for issuing the customer a receipt by the entrepreneur, a step for paying a second bank money for the electronic check or the electronic card by a first bank, a step for paying to the entrepreneur's deposit account money in accordance with the examined result by a second bank.

It is further preferable to comprise a step for sending the customer a receipt for the paid money and a password through the customer's registered e-mail address by a first bank if the payment for issuing the electronic check or the electronic card by using the Internet can not executed instantly or if the confirmation of customer's real name by a first bank is not executed exactly after the customer paid the money and a step for requesting a first bank to issue an electronic check or an electronic card after finishing the real name confirmation procedure by using the password received from a first bank.

It is preferable in order to get the customer identification that the customer registers a name, a resident registration number or business registration number, e-mail address, an account number for paying money, personal information including a password for confirming himself into a database for registering customers of a first bank.

It is preferable that the customer identification is a combination of a nationality code, a code for indicating a category of a customer and an inherent code of a customer.

It is preferable that the payment of money to a first bank to get an electronic check or an electronic card by the customer is executed by any one of a direct payment, a remittance, a postal transferring account, a giro, a CMS transferring account, a credit card, an advanced paying card and a direct paying card.

It is preferable in order to get an entrepreneur's identification that he registers a name, a resident registration number, a business registration number, a business category, an account number for paying the money, personal information including a password for confirming himself into a database for registering entrepreneurs of a second bank.

It is preferable in the step for issuing an electronic check or an electronic card that a first bank issues it after confirming whether the information on the customer requesting it coincides with the data stored in the customer registration database.

It is preferable in the step for examining the cash payment for an electronic check or an electronic card that a second bank examines it after confirming whether the information on the entrepreneur requesting it coincides with the data stored in the entrepreneur registration database.

The meaning of the "ware" through whole of the present invention is defined by all kinds of goods including goods, program, software, contents, data, merchandise coupon, membership card, food ticket, entrance ticket and usable ticket.

The FIG. 1 shows an electronic commercial transaction flow among customers, entrepreneurs and a bank.

The customer 200 pays money to a bank or bank server 100 at s1. The bank 100 sends the customer 200 a receipt for the paid money and a password by through the registered customer's e-mail address at s2. Registered customer information is stored in Registered Customer Data Base 120. The customer 200 requests the bank 100 to issue an electronic check or an electronic card by using the received password at s3. The bank 100 issues the electronic check or the electronic card in accordance with the request at s4. The customer 200 uses the electronic check or the electronic card in order to pay the money in purchasing or using wares provided by the entrepreneur 300 at s5. The entrepreneur 300 who received the electronic check or the electronic card requests the bank to pay in cash at s6. The bank 100 confirms whether the data of the requested electronic check or the electronic card coincides with the data stored in an issued check/card database 140 and sends the entrepreneur 300 the examined result for paying money at s7. The entrepreneur 300 received the examined result sends the customer 200 a receipt at s8 (in case of using the card, send confirmation documents for the remaining money together with the receipt). The bank 100 issuing the examined result adds up the total amount of received money every predetermined period and pays money to the assigned entrepreneur's 300 account at s9. Registered entrepreneurs information is stored in Registered Entrepreneur Data Base 160. But, if an instant approval on the Internet and real name confirmation are possible, the requesting for issuing an electronic check or an electronic card is executed without the step for confirming the real name of the customer by using the password.

The process from the issuing an electronic check or an electronic card to the settlement is as follows.

An entity providing the ware (hereinafter called 'entrepreneur') registers a name, a resident registration number or business registration number, a business category, an account number for paying a money, a password for confirming himself into a database for registering entrepreneurs 160 and 520 (FIG. 2) of a bank issuing Internet checks or Internet cards (hereinafter called 'bank') and gets an inherent identification of an entrepreneur (hereinafter called 'entrepreneur identification').

The required documents to get the entrepreneur's identification are a written application form for a member shop, a business registration sheet, a written copy of a bankbook, a legal seal, a certified copy of residence (a certified copy of registration of a legal entity), a written copy of a certificate of residence, etc.

The entrepreneur's identification comprises a nation code, a business category code (a selling business, a sale agency business, an advertising business, an information providing business, a business relating to goods for adult, etc.) and an entrepreneur's inherent code.

A customer goes to the bank and registers a name (a legal entity name), a resident registration number (business registration number), an e-mail address, an account number for paying money, a password for confirming himself into a database for registering customers 120 of a bank issuing an Internet check or an Internet card (hereinafter called 'bank') and gets an inherent distinction name (hereinafter called 'customer identification') of a bank after confirming his real name by using the certified copy of residence. If there is any change of the registered contents, the customer should register again. At this time, the validity becomes effective after a certain period.

The customer identification comprises a nationality code, a customer category code (an individual, an individual business man, a legal entity, a public organization, a government and public offices, etc.) and a customer inherent code.

It is preferable to make possible to register or to change the registered contents at cooperative banks or government and public offices. At this time, the registering date and time, an organization for registration, a registration place, a name of a person who takes charge of the registration, etc. are stored.

In order to request an Internet check or an Internet card, a customer should pay money in registration of the information by using any one of a direct payment, a remittance, a postal transferring account, a giro, a CMS transferring account, a credit card, an advanced paying card, and a direct paying card. After that, it is preferable that all transaction on the Internet is executed under a security system.

After a bank server confirms a customer identification, which paid money, it sends a receipt (a certificate of the transferring account, a certificate of the direct payment) and a password for a check issue or a card issue by using the customer's e-mail address registered in a customer registration database. The term of validity of a check or a card depends upon the bank, which issued them.

A customer registers a password, a customer's identification, a password for confirming himself, a residence registration number, an e-mail address and then requests to issue an Internet check or an Internet card after determining an issue-price, a limit price, a term of the validity, an identification of the recipient, a password (for an Internet card), a usable area and a business category for using an Internet check or an Internet card.

But, if a real time settlement on the Internet and a customer's real name confirmation are possible that is if he has a main account in a corresponding bank or a credit card of the bank, the request for issuing an Internet check or an Internet card is executed without confirming the real name of the customer by using the password.

And it is preferable that an entrepreneur pays for the issuing fee for a check and a card when the profits increase through the circulation of a check and a card in the electronic commercial transaction. But a customer should pay a fee, a collection charge and a double issuing fee in case of requesting to issue the check or card by using a electronic money or a direct paying card of a different bank.

Because the paying means for the issue-price of a check and a card are different, a bonus pointing system may be adopted. This system returns back a certain rate of the profits to the customer who paid by using a means, which is profitable to the bank.

A bank issues on the Internet a check or a card which consists of characters, sentence patterns, numbers, figures, symbols, passwords which include a symbol indicating a check or a card, an issuing bank symbol, an issuing date/hour/minute/second, an issuing number, an issuing price, a valid date/hour/minute/second, recipient identification, a usable area, a usable business category after a server of the bank confirms whether the information like a password for customer confirmation registered from the customer coincides with the data stored in a registered customer database.

The operation of a management register for issuing a check or a card depends upon the bank.

An Internet check is a check stating the issuing the issuing price and consists of (a) a check symbol, (b) an issuing bank symbol, (c) an issuing date/hour/minute, (d) an issuing number, (e), an issue-price, (f) an effective date/hour/minute, (g) a password.

A recipient assigning Internet check is a check stating an issue-price and a recipient and consists of (a) a check symbol, (b) an issuing bank symbol, (c) an issuing date/hour/minute, (d) an issuing number, (e), an issue-price, (f) a recipient identification (g) an effective date/hour/minute, (h) a password.

A recipient non-assigning Internet check is a check stating an issue-price and a recipient identification is written by the customer whenever he needs to use it and it consists of (a) a check symbol, (b) an issuing bank symbol, (c) an issuing date and hour, (d) an issuing number, (e) a first empty space for entering an issue-price, (f) a limiting issue-price and (g) a second empty space for entering a recipient identification, (h) an effective date, hour and minute, and (i) a password.

An Internet card is a check stating an issue-price and a prescribed amount of issuing fee is deducted by an entrepreneur after confirming through an issuing organization an assigned password and it consists of (a) a card symbol, (b) an issuing organization symbol, (c) an issuing date, (d) an issuing number, (e), an issue-price, (f) an effective date, (g) a symbol for indicating a usable area, (h) a symbol for indicating a usable business category and (i) a password.

The issuing bank symbol comprises a nation code, an inherent bank code and a branch office code. And the issuing organization symbol comprises a nation code and an inherent office code. The issuing organization comprises banks, security companies, department stores, airline companies, oil companies and service providers for the Internet portal sites.

The recipient identification is an entrepreneur's identification for a corresponding Internet site.

It is preferable for the recipient non-assigning Internet check that an entrepreneur's nation code or a business code for indicating the entrepreneur's business category is entered in a second empty space instead of the recipient identification in order to limit the usage of the check within a specific nation or a specific business category.

A bank determines the issue-price, the issue price limit, the usable area, the usable business category and the validity term for each paying means.

The issuing date/hour/minute/second and the effective date/hour/minute/second are standardized by the time of a bank.

The customer can request to suspend the validity of the issued check or card with a reason of loss or damage or others and the money can be paid back even though the validity term is remaining or elapsed.

The refund of the remaining of a recipient non-assigning check and the remaining of a card used over a predetermined level is possible. But, the decision of whether a service charge is imposed or not is determined by the bank.

On the other hand, the customer received a check or a card from an Internet bank uses the check or the card in the web site provided by the service provider in order to pay the money for purchasing or using wares (wares are defined as all the goods including goods, program, software, contents, data, merchandise coupon, membership card, food ticket, entrance ticket and usable ticket) provided by the service provider.

The provider requests to pay in cash for the paid electronic check or the electronic card by presenting it. In case of the card, the password is also presented.

The bank informs the provider server the examined result for payment in case of the check or the examined result and a certificate for remained money to the customer in case of the card after confirming whether the provider's information coincides with the data stored in a provider registration database.

The provider who received the examined result issues the customer a receipt for the check or a receipt and the certificate for remained money for the card. The bank sums the total inputted money every a predetermined period and pays it to the provider's assigned account. If any unfairness of the provider is found during the time between the examined result sending time and the money paying time, the customer can request the bank to postpone the payment for the check or the card.

The transaction of an Internet check or an Internet card among banks in case of the customer and the provider are registered in a different bank respectively is as follows. FIG. 2 shows the commercial transaction among banks, a customer and a provider.

At first, a customer 200 pays s11 directly and remits money to the registered bank (A) or bank server 400. The bank A 400 sends a receipt and a password to e-mail address registered in a customer registration database 420 at s12. The customer 200 requests bank A 400 to issue a check or a card by using the password at s13. The bank A 400 issues the customer 200 a check or a card at s14. The customer 200 uses the check or the card in order to pay for purchasing or using wares provided by the service provider 300 at s15. The provider 300 asks the registered bank A 400 to exchange the check or the card at s17. The bank A 400 informs the bank B 500 the confirmation result for exchanging after confirming whether the data of the check or the card coincides with the data stored in a check/card issuing database 440 at s18. The bank B 500 informs the provider 300 the examined result for payment at s19. The provider 300 issues the customer a receipt or a receipt and a certificate of remained money for the card s20. The bank A 400 pays the bank B 500 the exchanging money at s21 and the bank B 500 pays to the provider's assigned account the money after summing the total inputted money every an appropriate period at s22. However if a direct approval and real name confirmation are possible on the Internet, the requesting for issuing a check or a card is executed without confirming the real name of the customer by using the password.

The procedures from the issue to the approval of an Internet check and an Internet card among banks are as follows.

An entity providing wares through the Internet (hereinafter called 'provider') reports a name, a resident or business registration number, a business category, an account number for paying the money, a password for confirming himself to a bank paying for the Internet check or the Internet card (hereinafter called 'provider registration bank') and gets an inherent identification for distinction (hereinafter called 'provider identification') from the bank after registering the provider joining into a database for registration of providers.

The required documents to get the provider's identification are an application form for a member shop, a business registration sheet, a written copy of a bankbook, a legal seal (a legal seal for a legal entity), a certified copy of residence (a certified copy of a register for a legal entity), a certificate of residence, etc.

The provider's identification consists of a nation code, a business category code (a selling business, a sale agency business, an advertising business, an information providing business, a business relating goods for adult, etc.) and an inherent provider's code.

The customer goes to the bank which issued the Internet check or the Internet card (hereinafter called 'customer registration bank') and registers a name (a legal entity name), a resident registration number (business registration number), an e-mail address, an account number for paying money, a password for confirming himself into a database for registering customers of a bank issuing an electronic check or an electronic card (hereinafter called 'bank') and gets an inherent identification for distinction (hereinafter called 'customer identification') from the bank after finishing a confirmation for his real name by using his certified copy of residence. If there is any change of the registered contents, the customer should register again. At this time, the validity becomes effective after a certain period.

The customer identification comprises a nationality code, a customer category code (an individual, an individual business man, a legal entity, a public corporation, a government and public office, etc.) and an inherent customer code.

It is preferable that it is possible to register or to change the registered contents at cooperate banks or government and public offices. At this time, the registering date and time, an agency name executed the registration, a place where the registration takes places, a name of a person who takes charge of the registration, etc. are stored.

In order to request the issue of the Internet check or the Internet card (hereinafter called 'check or card'), the customer should pay to a server of the customer registration bank money with the registration of information by using a direct payment or a remittance or a postal transferring account or a giro or a CMS transferring account or a credit card or an advanced paying card or a direct paying card. After this, it is preferable that all transaction on the Internet is executed under a security system.

The customer registration bank server finishing confirmation of the customer's identification who paid money sends a receipt (a certificate of the transferring account, a certificate of the direct payment) and a password for the check or the card by through the customer's e-mail address registered in the customer registration database. The bank can determine the term of validity of the password for issuing a check or a chart.

The customer registers the password, the customer's identification, the password for confirming himself, the residence registration number, the e-mail address into the server of the customer registration bank and then requests to issue the check or the card after determining an issue-price, a price limit, a term of the validity, an identification of the recipient, a password (for the Internet card), a usable area and a business category for using the check or the card.

But, if the real time approval on the Internet and real name confirmation are possible like having a main account in the appropriate bank or having an appropriate credit card of the bank, the request for issuing the check or the card is executed without confirming the real name of the customer by using the password.

And for the issuing fee for the check and card, it is preferable that the provider pays when the profits increase through the circulation of the check and card in the electronic commercial transaction. But a customer should pay a fee, a collection charge and a double issuing fee in case of requesting to issue the check or card by using a electronic money or a direct paying card of a different bank.

Because the paying means for the issue-price of the check and card are different, a bonus pointing system may be adopted. This system returns back a certain rate of the profit to the customer who paid by using means, which is profitable to the bank.

The customer registration bank issues on the Internet a check or a card which consists of characters, sentence patterns, numbers, figures, symbols, passwords which include a symbol indicating a check or a card, an issuing bank symbol, an issuing date/hour/minute/second, an issuing number, an issuing price, a valid date/hour/minute/second, a recipient identification, a usable area, a usable business category after a server of customer registration bank confirms whether the information like a password for customer confirmation registered from the customer coincides with the data stored in a database for customer registration.

The bank is entrusted with the operation of a register for issuing a check or a card.

An Internet check is an issue-price stating check which consists of (a) a check symbol, (b) an issuing bank symbol, (c) an issuing date/hour/minute, (d) an issuing number, (e), an issue-price, (f) an effective date/hour/minute, (g) a password.

A recipient assigning Internet check is a check which states an issue-price and a recipient and consists of (a) a check symbol, (b) an issuing bank symbol, (c) an issuing date/hour/minute, (d) an issuing number, (e), an issue-price, (f) a recipient identification (g) an effective date/hour/minute, (h) a password.

A recipient non-assigning Internet check states an issue-price limit check and an issue-price and a recipient identification is entered by the customer whenever he needs to use and it comprises a first empty space for entering (a) a check symbol, (b) an issuing bank symbol, (c) an issuing date and hour, (d) an issuing number, (e) a first empty space for entering an issue-price, (f) an issue-price limit and (g) a second empty space for entering a recipient identification, (h) an effective date/hour/minute, and (i) a password.

An Internet card is an issue-price stating check and a prescribed amount of issuing fee is deducted by a provider after he confirms through an issuing organization the assigned password and it comprises (a) a card symbol, (b) an issuing organization symbol, (c) an issuing date, (d) an issuing number, (e), an issue-price, (f) a valid date, (g) a symbol for indicating a usable area, (h) a symbol for indicating a usable business category and (i) a password.

The issuing bank symbol comprises a nation code, an inherent bank code and a branch office code. And the issuing organization symbol comprises a nation code and an inherent organization code. The issuing organization comprises banks, security companies, department stores, airline companies, oil companies and service providers for the Internet portal sites.

The recipient identification is a provider's identification for an appropriate Internet site.

It is preferable for the recipient non-assigning Internet check that a provider's nation code or a business code for indicating the provider's business category is entered in a second empty space instead of the recipient identification in order to limit the usage of the check within a specific nation or a specific business category.

The bank determines the issue-price, the issuing price limit, the usable area, the usable business category and the validity term by each paying means.

The bank time is set on the basis of the issuing date/hour/minute/second and the valid date/hour/minute/second.

The customer can request to suspend the validity of the issued check or card with a reason of loss or damage or others and the remaining money of the used card or check can be refunded even though the validity term is remaining.

The refund of the remaining money of the recipient non-assigning check and the remaining of the card used over a predetermined level is possible. But, the decision of whether a service charge is imposed or not is determined by the bank.

On the other hand, the customer received the check or the card from the customer registration bank on the Internet uses the check or the card in the web site provided by the provider in order to pay the money for purchasing or using wares (including goods, program, software, contents, data, merchandise coupon, membership card, food ticket, entrance ticket and usable ticket) provided by the provider.

The provider requests to pay in cash for the paid check or the card by presenting it to the provider registration bank. In case of the card, the password is also presented.

The provider registration bank requests to exchange the check or the card to the provider registration bank after confirming whether the provider's information coincides with the data stored in a provider registration database.

The customer registration bank server informs the provider registration bank server the approval of the exchange of the check or the card and a certificate for the remaining money after confirming whether the provider's information coincides with the data stored in a database for issuing the check or the card.

The provider registration bank server received the approval from the customer registration bank server informs the provider server the examined result for payment of the check or the examined result and a certificate for remaining money to be informed to the customer in case of the card. The provider-received the examined result issues the customer a receipt for the check or a receipt and the certificate for remained money for the card.

The customer registration bank sends the provider registrations bank the money corresponding to the exchanged check or card every predetermined period. The provider registration bank sums the total inputted money every predetermined period and transfers to the provider's assigned account. If any unfairness of the provider is found during the time between the examined result sending time of the provider registration bank and the actual money payment time, the customer can request customer registration bank to postpone the money payment for the check or the card.

Although the preferred embodiments of the present invention have been described and illustrated in detail, it will be evident to those skilled in the art that various modifications and changes may be made thereto without departing from the spirit and the scope of the invention as set forth in the appended claims and equivalents thereof.

The benefits due to the present invention are as follows.

1. Due to the development of computer technologies, it is possible to use an Internet check and an Internet card having no shape.
2. Due to the no shape, there is no fixed charge and the charge for issuing is cheap.
3. Due to the cheap charge, it is possible to contribute to the activation of the electronic commercial transaction.
4. Due to the register identification of customers and providers, it is possible to legalize the electronic commercial transaction.
5. Due to the legalization, the source and the flow of the money are opened and an appearance of unlawful money is cut off.
6. Due to the legalization, it is helpful to impartial tax.
7. It is possible to request bank an account for transaction as an evidence of payment.
8. It is possible to realize a single model usable through the whole world by using a combination of a nation code, an inherent bank code and a branch office code, a combination of a nation code, a business category code and an inherent provider code, and a combination of a nation code, a category code and an inherent customer code.
9. By making it possible transact small sum of money, it is possible to make provider's web site be charged and then it is possible to make the web site contents more substantial and induce its development.
10. By sending a password to the registered e-mail address, it is possible to reconfirm whether the customer is true or not by reconfirming the password and a password for confirming the customer when a check or a card is issued.
11. Due to a recipient assigning check, it is possible to use it safely.
12. It is possible to issue a check or a card, which is usable in a specific area or in a specific business category if the customer wants.

13. It is possible for an individual to request a bank to pay for a received or a received card after registering as a provider and getting provider identification.

14. It is possible for a provider to pay money by using the check or the card after registering as a customer and getting customer identification.

15. The government or a public institution can use this system because they may be a customer or a provider.

16. The customer can check validity of the check or the card, particulars of transaction and total amount of remaining money at any time.

17. If any unfairness of the provider is found during the time between the examined result sending time of the bank and the money paying time, the customer can raise an objection about the paying money for the check or the card.

What is claimed is:

1. An electronic Internet check used in electronic commerce based on the Internet, said check comprising:
    a check symbol for indicating a kind of the check;
    a bank symbol for indicating a bank issuing the check;
    an issuing date symbol for indicating the issuing date;
    an issuing date symbol for indicating an issuing number of the check;
    an issue-price symbol for indicating the price of the issued check; and
    a password symbol for indicating a password of the issued check;
    wherein said symbols consist of characters, numbers, figures, symbols or a combination thereof.

2. The Internet check as set forth in claim 1, wherein the Internet check further comprises a validity symbol for indicating the term of validity of the check.

3. The Internet check as set forth in claim 1 or 2, wherein the Internet check further comprises a recipient's identification symbol for indicating in assigned recipient of the check.

4. The Internet check as set forth in claim 3, wherein the bank symbol is a combination of a nation code, an inherent bank code and a branch office's code.

5. The Internet check as set forth in claim 3, wherein the recipient's identification symbol is identical to the business licensed identification of the recipient and is a combination of a nationality code of a business entity, a business category code of the business and an inherent code of a business entity.

6. An electronic Internet check used in electronic commerce based on the Internet, said check comprising:
    a check symbol for indicating a kind of the check;
    a bank symbol for indicating a bank issuing the check;
    an issuing number symbol for indicating the issuing date;
    an issuing number symbol for indicating an issuing number of the check;
    a first empty space for entering an issue-price;
    an issue-price limit symbol for indicating the limit of issue-price of the issuing check; and
    a second empty space for entering a recipient's identification and a password symbol for indicating a password of the issued check,
    wherein said symbols consist of characters, numbers, figures, symbols or a combination thereof.

7. The Internet check as set forth in claim 6, wherein the Internet check further comprises a validity symbol for indicating the term of validity of the check.

8. The Internet check as set forth in claim 6 or 7, wherein a nationality code of a business entity and a business category code of the business are entered in said second empty space for entering recipient's identification to limit the usage of the check within a specific country and a specific category of the business.

9. The Internet check as set forth in claim 8, wherein the bank symbol is a combination of a nation code, an inherent bank code and a branch office's code.

10. The Internet check as set forth in claim 8, wherein the recipient's identification symbol is identical to the business licensed identification of a recipient and is a combination of a nationality code of the business entity, a business category code of the business and an inherent code of the business entity.

11. An electronic Internet card used in electronic commerce based on the Internet, said card comprising:
    a card symbol for indicating a kind of the card;
    an issuing organization symbol for indicating an issuing organization of the card;
    an issuing date symbol for indicating an issuing date;
    an issuing number symbol for indicating an issuing number of the card;
    an issuing-price symbol for indicating the price of the issued card; and
    a password symbol for indicating a password of the issued card,
    wherein said symbols consists of characters, numbers, figures, symbols or a combination thereof.

12. The Internet card as set forth in claim 11, wherein the Internet card further comprises a validity symbol for indicating the term of validity of the card.

13. The Internet card as set forth in claim 11 or 12, wherein the Internet card further comprises a using area limit symbol for indicating a usable area of the card.

14. The Internet card as set forth in claim 13, wherein the Internet card further comprises a business category limit symbol for indicating a usable business category of the card.

15. The Internet card as set forth in claim 13, wherein the issuing organization symbol consists of a nation code and an inherent code of an issuing organization, and the issuing organization includes banks, security companies, department stores, airline companies, oil companies and service providers for the Internet portal sites.

16. An Internet based electronic commerce method using electronic checks and electronic cards among customers, providers and a bank, said method comprising the steps of:
    requesting a bank to issue an electronic check or an electronic card by a customer after the customer pays money to the bank and the bank confirms the customer's real name;
    issuing the customer at least one electronic check or the electronic card by the bank in denominations equal to said payment;
    using the electronic check or the electronic card by the customer in order to pay the money for purchasing or using wares of the provider;
    asking the bank to pay in cash for the paid electronic check or the electronic card by the provider;
    informing the provider of an examination result for payment by the bank after confirming whether the data of the electronic check or the electronic card coincides with the data stored in a check/card issuing database;
    issuing the customer a receipt by the provider; and
    paying money to the provider's deposit account money in accordance with the examined result by the bank.

17. The method as set forth in claim 16, wherein the method further comprises the steps of:

sending the customer a receipt for the paid money and a password through the customer's registered e-mail address by the bank if the method for paying money for the issued amount of money of the electronic check or the electronic card on the Internet can not be executed in real time or if the confirmation of the customer's real name by the bank is not exact; and requesting the bank to issue an electronic check or an electronic card after finishing the real name confirmation procedure by using the password received from the bank.

18. The method as set forth in claim 16 or 17, wherein the customer registers to store the customer's identification a name, a resident or business registration number, an e-mail address, an account number for paying the money and personal information including a password for confirming himself into a customer registration database of the bank and the customer identification is a combination of a nationality code, a code for indicating category of the customer and an inherent code of the customer.

19. The method as set forth in claim 16 or 17, wherein the provider registers to get the provider's identification a name, a resident registration number, a business registration number, a business category, an account number for paying the money, personal information including a password for confirming himself into a database for registering providers in the bank.

20. The method as set forth in claim 16 or 17 wherein the electronic check or the electronic card is issued after confirming whether information of the customer coincides with the data stored in the customer registration database.

21. The method as set forth in claim 16 or 17, wherein the cash payment for the electronic check or the electronic card is examined after confirming whether information of the provider coincides with the data stored in the provider registration database.

22. An Internet based electronic commerce method using electronic checks and electronic cards among customers, providers and banks, said method comprising the steps of:

requesting a first bank to issue an electronic check or an electronic card to a customer after the customer pays money to a first bank and a first bank confirms the customer's real name;

issuing the customer at least one electronic check or the electronic card by the first bank in denominations equal to said payment;

using the electronic check or the electronic card by the customer in order to pay the money for purchasing or using wares of the providers;

asking a second bank to pay in cash for the paid electronic check or the electronic card by the provider;

requesting the first bank to exchange the electronic check or the electronic card by the second bank;

informing the second bank of an examination result for payment after confirming whether the data of the electronic check or the electronic card coincides with the data stored in a check/card issuing database by the first bank;

informing the provider of the examination result by the second bank;

issuing the customer a receipt by the provider;

paying the second bank money for the electronic check or the electronic card by the first bank; and paying to the provider's deposit account money in accordance with the examination result by the second bank.

23. The method as set forth in claim 22, wherein the method further comprises the steps of:

sending the customer a receipt for the paid money and a password through the customer's registered e-mail address by the first bank if the money payment for issuing the electronic check or the electronic card on the Internet is not executed in real time or if the confirmation of the customer's real name by the first bank is not executed exactly; and requesting the first bank to issue the electronic check or the electronic card after finishing the real name confirmation procedure by using the password received from the first bank.

24. The method as set forth in claim 22 or 23, wherein the customer registers to get the customer's identification a name, a resident or business registration number, am e-mail address, an account number for paying the money, personal information including a password for confirming the customer into a database for registering customers in a first bank and the customer identification is a combination of a nationality code, a code for indicating category of the customer and an inherent code of the customer.

25. Method as set forth in claim 22 or 23, wherein the provider registers to get the provider's identification a name, a resident registration number, a business registration number, a business category, an account number for paying the money, personal information including a password for confirming himself into a database for registering of providers in a second bank.

26. The method as set forth in claim 22 or 23, wherein the electronic check or the electronic card is issued after confirming whether information of the customer coincides with the data stored in the customer registration database.

27. The method as set forth in the claim 22 or 23, wherein the second bank for requesting of cash payment requests of the first bank to exchange the electronic check or the electronic card after confirming whether information of the provider coincides with the data bank stored in the provider registration database.

\* \* \* \* \*